Nov. 17, 1925.
S. G. DOWN
1,561,703
BRAKE SHOE CONSTRUCTION
Filed Nov. 1, 1923
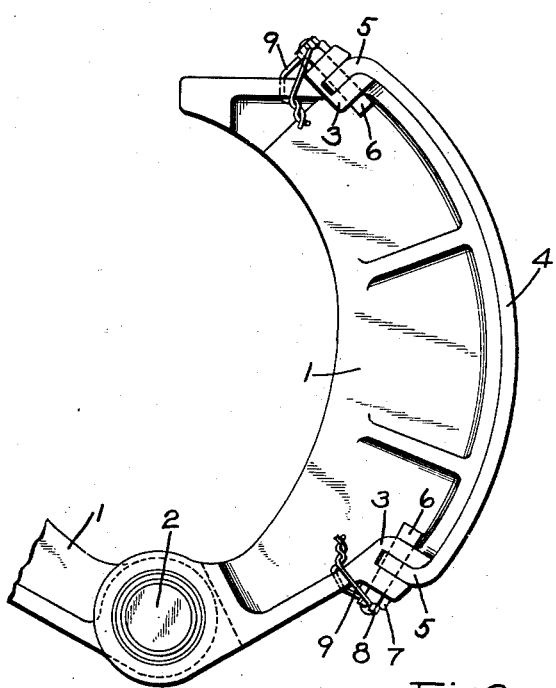
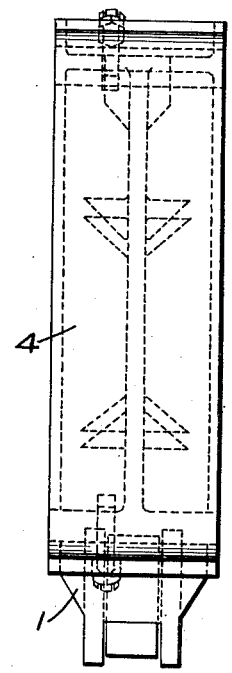
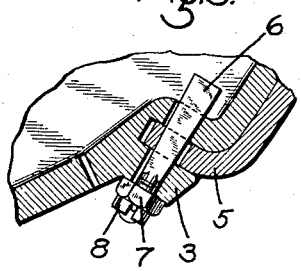
INVENTOR
SIDNEY G. DOWN
BY *Wm. M. Cady*
ATTORNEY Patented Nov. 17, 1925.

1,561,703

UNITED STATES PATENT OFFICE.

SIDNEY G. DOWN, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

BRAKE-SHOE CONSTRUCTION.

Application filed November 1, 1923. Serial No. 672,121.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction adapted for application to the internal expanding drum type of brake, such as employed on motor vehicles.

The principal object of my invention is to provide an improved brake shoe construction of the above character which is adapted to be removed and applied without removing the vehicle wheel.

In the accompanying drawing; Fig. 1 is a side elevation of a brake head showing my improved brake shoe applied thereto; Fig. 2 a face-view of the construction shown in Fig. 1, and Fig. 3 is an enlarged sectional view of the fastening means shown in Figure 1.

The construction shown in the drawing comprises brake heads 1 connected by the usual pivot pin 2 and adapted to be expanded by the usual cam (not shown), so that brake shoes applied to the brake heads will engage the internal friction face of the usual brake drum (not shown).

According to my invention, in order to secure the brake shoe to the brake head, the brake head is provided with lugs 3 at opposite ends of the arcuate shoe engaging face of the head. each lug being provided with a transverse slot. The brake shoe 4 is formed with radial, inwardly turned ends 5 adapted to engage in the transverse slots of the lugs 3, and said ends as well as the lugs 3 are provided with openings at one side of the central web of the brake head for receiving a wedge member 6.

After the shoe has been applied to the arcuate face of the brake head, with the ends 5 engaging the slots in the lugs 3, the wedges 6 are inserted in the openings provided for that purpose and each wedge is drawn up by a nut 7, so that the ends of the shoe 4 are securely held in position and the shoe is tightly clamped against the brake head. A jam nut 8 may be applied to the nut 7, said jam nut being prevented from backing off by means of a wire 9.

By the above means, the ends of the brake shoe are held tightly in position and any tendency of the ends to curl up due to heat generated in applying the brakes is prevented, so that wear of the brake shoe is evenly distributed throughout its length.

It will be noted that the brake shoe may be applied and removed without removing the vehicle wheel, since with the wedges 6 withdrawn, the shoe may be shifted axially with respect to the brake head.

Having now described my invention, what I claim as new and desire to secure by Letters Patent, is:—

1. The combination with a brake head having an arcuate face and lugs at opposite ends of said face each provided with a transverse slot, of a brake shoe formed to engage said face and having inturned ends adapted to engage in said slots, and a wedge extending through apertures in each lug and each brake shoe end for drawing said shoe into clamping engagement with said brake head.

2. The combination with a brake head having an arcuate face and apertured lugs at opposite ends of said face, each provided with a transverse slot, of a brake shoe formed to engage said face and having upturned ends adapted to engage in said slots and a wedge extending through the apertures in each lug and through an aperture in each brake shoe end, so as to present a wedging face to said brake shoe end for drawing the shoe into engagement with the brake head.

In testimony whereof I have hereunto set my hand,

SIDNEY G. DOWN.